(12) United States Patent
Porcher et al.

(10) Patent No.: US 11,489,425 B2
(45) Date of Patent: Nov. 1, 2022

(54) ROTOR HAVING AN INJECTED CAGE

(71) Applicant: MOTEURS LEROY-SOMER, Angouleme (FR)

(72) Inventors: Sébastien Porcher, Saint Palais de Blaye (FR); Thierry Visse, Bunzac (FR); Stéphane Boulin, L'isle d'Espagnac (FR); François Turcat, Montignac sur Charente (FR)

(73) Assignee: MOTEURS LEROY-SOMER, Angouleme (FR)

( * ) Notice: Subject to any disclaimer, the term of this patent is extended or adjusted under 35 U.S.C. 154(b) by 167 days.

(21) Appl. No.: 16/635,604

(22) PCT Filed: Jul. 30, 2018

(86) PCT No.: PCT/EP2018/070563
§ 371 (c)(1),
(2) Date: Jan. 31, 2020

(87) PCT Pub. No.: WO2019/025350
PCT Pub. Date: Feb. 7, 2019

(65) Prior Publication Data
US 2020/0244150 A1 Jul. 30, 2020

(30) Foreign Application Priority Data
Jul. 31, 2017 (FR) ...................................... 1757305

(51) Int. Cl.
*H02K 15/00* (2006.01)
*H02K 17/20* (2006.01)

(52) U.S. Cl.
CPC ......... *H02K 17/20* (2013.01); *H02K 15/0012* (2013.01)

(58) Field of Classification Search
CPC .... H02K 17/205; H02K 17/165; H02K 17/20; H02K 15/00; H02K 15/0012; H02K 15/0018; H02K 15/0025; H02K 15/0031; H02K 15/0043; H02K 15/005; Y10T 29/49012
See application file for complete search history.

(56) References Cited

U.S. PATENT DOCUMENTS

| 3,832,583 | A | 8/1974 | Chang |
| 6,177,750 | B1 | 1/2001 | Tompkin |
| 6,877,210 | B2 * | 4/2005 | Hsu ................... B22D 19/0054 |
| | | | 219/76.13 |

(Continued)

OTHER PUBLICATIONS

Oct. 13, 2021 Office Action Issued in U.S. Appl. No. 16/635,818.
Apr. 5, 2022 Office Action issued in U.S. Appl. No. 16/635,818.

*Primary Examiner* — Leda T Pham
(74) *Attorney, Agent, or Firm* — Oliff PLC

(57) ABSTRACT

A method for manufacturing a rotor of a rotary electric machine, including a stack of magnetic laminations defining the slots in which bars made from a first electrically conducting material are received, in which method a second electrically conducting material, different from the first, is injected using an injection machine, from the front of the laminations stack, the bars being held at their rear end against the pressure associated with the injection by a positioning tool that passes through a cavity used for forming a short-circuiting ring at the rear of the laminations stack.

13 Claims, 3 Drawing Sheets

(56) References Cited

U.S. PATENT DOCUMENTS

| | | | |
|---|---|---|---|
| 8,684,257 B2 * | 4/2014 | Osborne | H02K 15/0012 |
| | | | 228/165 |
| 9,071,112 B2 * | 6/2015 | Maeda | H02K 15/0012 |
| 10,476,361 B2 * | 11/2019 | Brandl | H02K 1/26 |
| 2011/0140565 A1 | 6/2011 | Yabe et al. | |
| 2011/0316380 A1 * | 12/2011 | Buttner | H02K 17/205 |
| | | | 310/211 |
| 2013/0187512 A1 | 7/2013 | Buttner et al. | |
| 2015/0222164 A1 * | 8/2015 | Hippen | H02K 3/48 |
| | | | 310/211 |
| 2015/0295483 A1 | 10/2015 | Brandl et al. | |
| 2018/0006537 A1 | 1/2018 | Terasawa et al. | |
| 2018/0123432 A1 | 5/2018 | Scherer et al. | |

\* cited by examiner

ROTOR HAVING AN INJECTED CAGE

The present invention relates to rotary electric machines, and more particularly to the rotors of such machines.

BACKGROUND

Asynchronous electric motors conventionally comprise a stack of magnetic laminations, with slots passing through this laminations stack. Aluminum is injected under pressure to form bars which are connected to the outside of the laminations stack by short-circuiting rings.

In order to improve electrical performance, it may prove advantageous to reduce the electrical resistivity of the bars still further by replacing the aluminum with copper. However, because the melting point of copper is far higher than that of aluminum, it becomes difficult to inject copper into the slots.

One known solution thus consists in introducing conducting copper bars into the slots and in injecting aluminum under pressure to fill the space left empty by the bars inside the slots.

Applications WO2011015494, WO2010100007, WO2009038678, US2011291516, WO2014067792, WO2011020788, WO2015071156, WO2012041943, JPH10234166, CN1925280, JPH11206080, JP2005278373, and JPH1028360 describe rotors of which the laminations stacks have slots accepting copper bars and into which aluminum is injected under pressure.

Application US 2015/288265 discloses a rotor comprising a stack of laminations and a cast structure. The latter comprises two end rings and a plurality of grooves around the laminations stack extending between these end rings.

Application DE 102010041796 discloses a rotor comprising a wire wound around copper bars in order to prevent the latter from oscillating as the aluminum is cast.

Application JPS56103953 discloses a rotor comprising copper bars inserted in slots of a laminations stack and short-circuiting rings made of aluminum cast on the ends of the bars, and in which the laminations are angularly offset about the axis of rotation of the rotor.

SUMMARY

One problem that arises when injecting aluminum is that of holding the bars in the corresponding slots. This retention needs not to hamper the creation of the rear short-circuiting ring.

The invention seeks to solve this problem, and achieves this using a method for manufacturing a rotor of a rotary electric machine, comprising a stack of magnetic laminations defining the slots in which bars are made from a first electrically conducting material are received, in which method a second electrically conducting material, different from the first, is injected using an injection machine, from the front of the laminations stack, the bars being held at their rear end against the pressure associated with the injection by a positioning tool that passes through a cavity used for forming a short-circuiting ring at the rear of the laminations stack.

By virtue of the invention, the bars are held axially in the slots during the injection without there being a need to provide specific arrangements in the region of the slots. The manufacture of the rotor can therefore remain simple. For example, thanks to the axial retention of the bars by the positioning tool during injection, there is no need to provide firm clamping of the bars in the laminations stack in order to immobilize them axially relative to said stack. It is possible to insert the bars into the slots with a relatively large clearance. Thus, there is no need to use precision-machined copper bars and it is possible to use bars in their as-extruded state. That avoids expensive machining operations. Neither is it necessary to provide elements attached to the bars in order to immobilize them relative to the laminations stack, such as wires wound around the bars, which complicate the production of the rotor. In addition, the insertion of the bars into the slots is made easier, because firm clamping is not needed, and the use of a powerful press to drive the bars into the slots is avoided, which press would otherwise be indispensable. Because the bars do not need to be firmly clamped in the slots, that also offers greater design freedom in the choice of the shape of the slots and the cross section of the bars, and shapes that optimize certain properties, such as, for example, electrical performance and/or slot-filling, can be selected more easily.

Preferably, the bars protrude beyond the laminations stack to come into contact with the positioning tool.

Preferably, the bars are in the as-extruded state, and are not machined along their length.

Preferably, the bars are housed in the slots with a clearance present between the bars and the slots. In particular, this clearance may be such that, in the absence of the positioning tool, the injection pressure would cause the bars to move axially within the stack. In other words, the clamping of the bars within the stack prior to the injection step is not firm enough for the bars to be able to withstand the pressure of the injection without moving relative to the stack, in the absence of the positioning tool.

The positioning tool can be withdrawn on the demolding of the rotor.

The positioning tool may comprise fingers each having a slightly conical shape converging toward the laminations stack.

Preferably, the first material is copper and the second material aluminum.

The rotor may comprise a ring made from a conducting material, preferably the first conducting material, to come into contact with the positioning tool. In that case, the number of fingers is, for example, lower than the number of bars.

Preferably, the magnetic laminations contain a magnetic steel, for example silicon steel, with its various grades. The thickness of each lamination is for example comprised between 0.35 mm and 0.65 mm.

A further subject of the invention is a rotor of a rotary electric machine, notably obtained by implementing the method defined hereinabove, comprising:
  a stack of magnetic laminations exhibiting slots,
  bars made from a first conducting material housed in the slots,
  a second material injected into the slots,
  short-circuiting rings cast with the second material injected into the slots, one of these rings having recesses opening to the outside and extending as far as the bars or as far as an annular-shaped insert resting on the bars.

DESCRIPTION OF THE FIGURES

The invention will be able to be better understood from reading the following detailed description of non-limiting exemplary implementations thereof, and from examining the appended drawing, in which.

ROTOR

Figure 1:
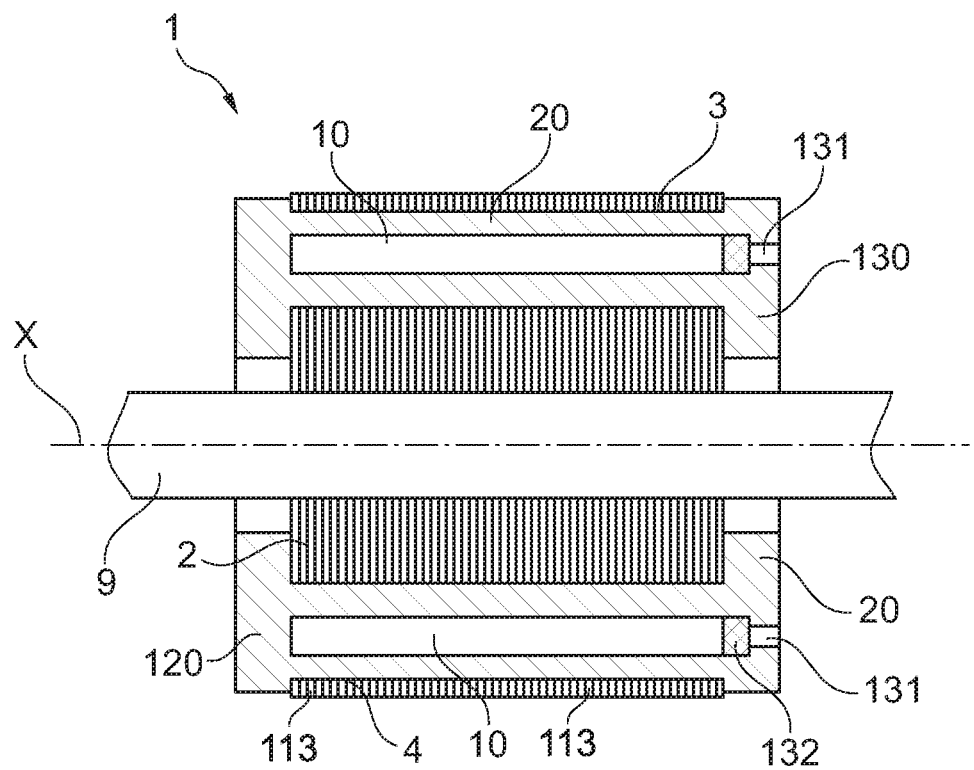
FIG. 1 depicts, in schematic and partial axial section, one example of a rotor according to the invention.

FIG. 1 depicts a rotor 1 according to the invention. This rotor 1 comprises a stack of magnetic laminations 2, which are mounted on a shaft 9, for example made of steel, of axis X.

This stack 2 is formed by the superposition of magnetic laminations 113 in which openings 3 are cut.

The superposition of the openings 3 of the laminations 113 forms, within the stack 2, slots 4 which extend longitudinally from one axial end of the stack 2 to the other. The slots 4 may be straight, which means to say that all the laminations 113 are exactly superposed without any angular offset from one lamination 113 to the next. However, as a preference, the laminations 113 are superposed with a slight angular offset from one lamination to the next so that the longitudinal axes of the slots 4 follow a helical path around the axis of rotation of the rotor, in a way known per se.

In the example illustrated, all the laminations 113 are identical and the openings 3 are identical also, such that the stack 2 comprises slots 4 that are identical. In alternative forms, the stack. 2 is formed by assembling laminations 113 which are not strictly all identical when viewed face-on, from the front of the stack 2, such that the cross section of a slot 4 may exhibit a shape which varies when progressing from the front end of the slot 4 to the rear end. In particular, the laminations 113 may be identical when cut, but may be assembled with certain laminations inverted with respect to others, such that they cause the cross section of the slots 4 to evolve when progressing along the axis of rotation.

The rotor 1 comprises copper bars 10, inserted into the slots 4, and a material 20, such as aluminum, injected into the slots 4 in the space left empty by the bars 10.

Short-circuiting rings 120 and 130 are cast in aluminum at the ends of the laminations stack 2. These rings 120 and 130 are of one piece with the aluminum poured into the slots 4.

As illustrated in FIG. 1, the rotor 1 comprises, at the rear short-circuiting ring 130, recesses 131 which correspond to the outline of the tool used when injecting aluminum, as will be described later on.

The bars 10 comprise portions 132 which protrude into the rear short-circuiting ring 130 acid which define the bottom of the recesses 131.

Slots with Friction Reliefs

Certain slots may have friction reliefs 5 designed to retain the bars 10 by friction, and blocking reliefs 30.

These friction reliefs 5 are visible for example in the alternative forms of embodiment of the slots in FIGS. 3A to 3D.

As illustrated, at least part of the openings may have reliefs 5 over at least part of their periphery, the electrically conducting bars 10 housed in the slots 4 coming to bear via at least one principal face 11 against said reliefs 5.

These reliefs 5 may allow the bars to be held effectively inside the laminations stack. The reliefs 5 may be created very accurately during the cutting of the laminations, and allow a greater tolerance on the cross section of the bars.

In particular, when a material 20 is injected into the slots 4 around the bars 10, the latter may remain motionless within the stack. The reliefs 5 may also reduce the force that has to be exerted on the bars 10 in order to insert them into the laminations stack, by reducing the area of contact between the bars 10 and the laminations.

The reliefs 5 may even, by reducing the area of contact between the bars 10 and the laminations, reduce the inter-bar current circulating through the laminations and the corresponding joule-effect energy losses.

The reliefs 5 are preferably present on opposite long sides 4a of the slots, these long sides 4a extending substantially radially, and the conducting bars 10 come to bear against these reliefs 5 via two opposite principal faces 11.

The reliefs 5 may take the firm of bosses, preferably extending over substantially the entire radial dimension of a bar 10.

Figures 3A, 3B, 3C, 3D:
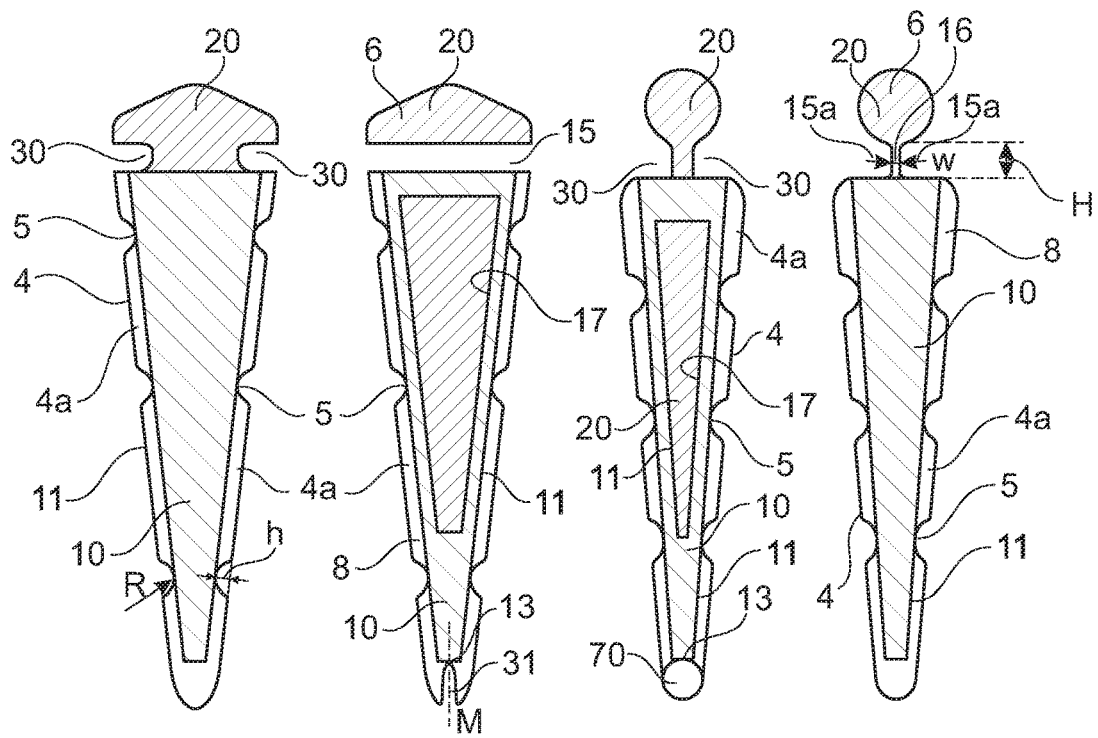
FIGS. 3A to 3D depict various alternative forms of embodiment of the slots.

The bosses 5 may have an amplitude h of between 0.2 and 0.4 mm, for example of 0.3 mm, as illustrated in FIG. 3A. The bosses 5 may be of rounded shape and have for example a radius of curvature R at their vertex of between 0.4 and 0.6 mm, for example of 0.5 mm.

All the laminations of the stack may be identical.

Slots with Blocking Reliefs

At least one lamination of the stack may have at least one blocking relief 30 that comes to bear against a radially exterior end face of a corresponding bar 10, and, better still, two such reliefs 30 opposite one another, each coming to bear against the same end face, as depicted in FIGS. 3A and 3C.

At least one lamination of the stack may have at least one blocking relief 31 that comes to bear against an end face 13, radially on the inside of a corresponding bar, as illustrated in FIG. 3B. This blocking relief 31 is preferably centered on the median plane M of symmetry of the corresponding opening.

Slots with Separating Reliefs

As illustrated in FIGS. 3B and 3D, separating reliefs 15 or 15a may extend within the openings and separate the slots 4 into distinct first 6 and second 8 compartments, the first compartments 6 being radially on the inside with respect to the second compartments 8.

The conducting bars 10 made of the first material may be placed in the first or second compartments of at least part of the slots 4. The second electrically conducting material 20 can then be placed in the other compartments of these slots 4. The separating reliefs 15 or 15a which extend within the openings prevent the first and second materials from coming into contact. In this way, potential corrosion phenomena are avoided.

The separating reliefs 15 or 15a may be of various shapes, being produced by cutting-out with the material of the magnetic laminations.

In the example of FIG. 3B, the separating reliefs are bridges of material 15 which separate each slot 4 into non-communicating first and second compartments 6 and 8.

In the alternative form of FIG. 3D, the separating reliefs consist of projections 15a positioned facing one another and which between them leave a canal 16 that is narrow enough to prevent contact between the first and second materials. For example, when the first compartments 6 are filled with molten aluminum 20 by injection, canals 16 of a width w less than 0.6 mm and a height H less than 2 mm may be enough to prevent the aluminum 20 from entering the second compartments 8 through the canals 16.

The conducting bars 10 made of the first material can be inserted into the first compartments 6, the first material preferably being copper, the second material 20 being injected into the second compartments 8, this second material preferably being aluminum. Such an embodiment is especially suitable for a machine intended to be driven with a current of fixed frequency. Specifically, when the motor is connected to the mains network, the starting of the motor demands a high inrush current compared with the nominal point. Because the ratio between the starting inrush current and the nominal current is limited by the applicable standards, the objective is to reduce it. On start-up, the part of the slot that generates the electrical resistance is predominantly the top of the slot, near the gap, because of the skin effect. In order to limit this starting current, the resistance of the cage needs to increase. Thus, having the material of greater electrical resistivity closer to the gap makes it possible to reduce the starting current.

In an alternative form of embodiment, the conducting bars 10 made from the first material are inserted into the second compartments 8, this first material preferably being copper, the second material 20 being injected into the first compartments 6, this second material 20 preferably being aluminum. Such an embodiment is especially suitable for a motor connected to a variator, for variable-speed drive. In this case, the starting current is not a constraint. Locating the material of lower electrical resistivity in the compartment closer to the gap and, if appropriate, introducing an aperture, notably in the form of a slit, on that side of the gap that has no electrically conducting material, makes it possible to reduce the electrical losses. In addition, the presence of a bar in the upper part of the slot prevents the second material from flowing through the aperture, if present, in the slot on the side of the gap during injection.

Hollow Bars

One or more of the bars may be hollow.

In the alternative forms illustrated in FIGS. 3B and 3C, the bars 10 are hollow and have a longitudinal interior cavity 17 which is filled with the injected second material 20.

The fact that the bars 10 are hollow makes it easier to fill the cavity used for casting the rear short-circuiting ring, when injection is performed from the front.

In addition, the total quantity of copper used can be lower, making it possible to reduce the cost of the machine.

The second material 20 which is injected into the bars 10 is protected from contact with the oxygen of the air by the material of the bars 10, except at the axial ends of these bars. In this way, phenomena of corrosion at the interface between the first and second materials are limited.

The bars 10 preferably have, in transverse section, a closed contour which may be non-circular.

As a preference, the second material 20 fills the slots also on the outside of the bars 10, notably when the bars 10 do not occupy the entire cross section of the slots 4.

Figure 6:
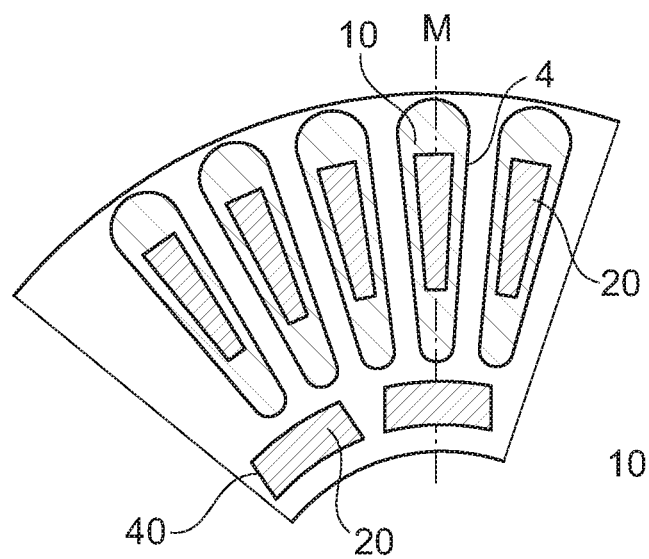

The bars 10, whether hollow or not, may extend over the entire radial dimension of the slots, as in FIG. 6. In particular, the bars 10 may have a transverse section which is substantially the same shape as the slots 4.

Figure 4:
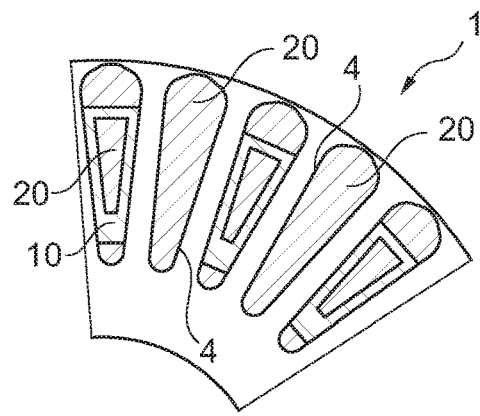
FIGS. 4 to 6 illustrate, schematically and partially in transverse section, a rotor cage according to the invention, and FIG. 7 schematically depicts, in axial section, one alternative form of embodiment of a rotor according to the invention.

As an alternative, the bars, whether hollow or not, have a radial dimension which is smaller than that of the slots, as in FIG. 4.

The bars 10, whether hollow or not, may extend over at least the length of the laminations stack.

All of the slots 4 of the rotor may comprise hollow bars 10 with the second material 20 injected inside. As an alternative, it is possible for certain slots not to comprise a bar, these slots in that case being completely filled with the second material 20. The rotor for example comprises more slots with bars than slots without bars, or vice versa.

Number of Bars Lower than the Number of Slots

In the alternative form illustrated in FIG. 4, the bars 10 are present in just part of the slots 4.

The absence of bars 10 in certain slots 4 makes it possible to maintain a greater total cross section for the passage of the injected aluminum, thus making it easier to fill the rear ring when injection is performed from the front.

The presence of bars 10 made from a material with lower electrical resistance, such as copper, in certain slots improves the electrical performance. It is possible, by choosing the number of bars added, to optimize the improvement in performance against the cost of the machine, copper being more expensive than aluminum.

The rotor may comprise more slots 4 with bars 10 than slots 4 without bars 10. In other alternative forms, the opposite is true, and the rotor comprises more slots 4 without bars 10 than with bars 10.

There are numerous possible arrangements of the bars within the slots 4. For example, a slot without a bar and a slot with a bar may be alternated in the circumferential direction. It is also possible in more general terms to have n1 slots without a bar alternating with n2 slots with a bar, n1 and n2 being integers strictly greater than 1.

Secondary Slots

Figure 5:
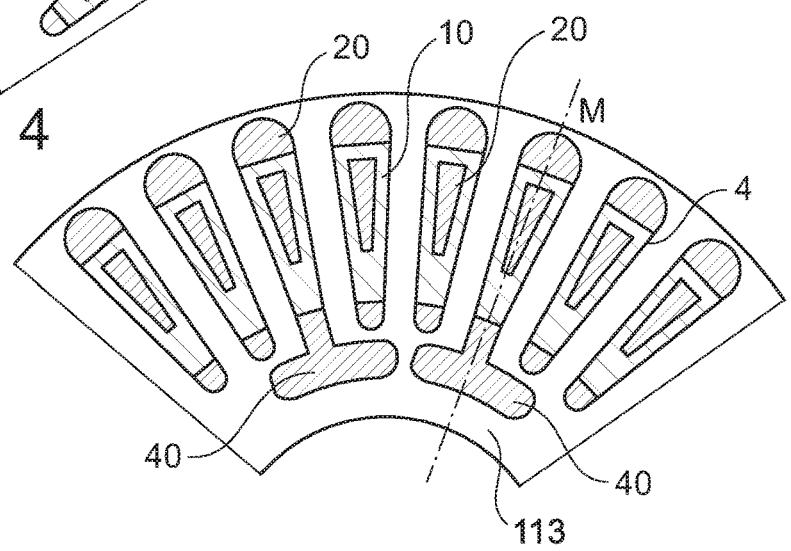

As illustrated in FIGS. 4 and 5, the openings may form, within the stack, n main slots 4 as defined above and m secondary slots 40, radially on the inside with respect to the main slots, where n and m are non-zero integers and n>m.

The secondary slots 40 provide the benefit of a greater passage cross section for the second conducting material, during injection. Because the latter material is injected from the front, having a larger passage cross section allows the rear short-circuiting ring to be created without defect.

The secondary slots 40 are separate from the main slots 4 in the example of FIG. 6.

In the alternative form illustrated in FIG. 5, each secondary slot 40 communicates with a main slot 4.

Each secondary slot 40 may be centered on a median plane M of a main slot 4.

The ratio n/m between the number of main slots 4 and the number of secondary slots 40 is, for example, equal to 2 or 3.

The secondary slots 40 preferably have an angular extent, measured about the center of the laminations stack, that is greater than that of a main slot 4.

Blocking Elements

The machine may comprise pins or rivets 70 inserted in the slots in contact with the bars.

As illustrated in FIG. 3C, these pins or rivets 70 are placed in the bottom of the slots 4 to come to bear against the radially inner end face 13 of the bars 10.

The pins or rivets 70 may be of conical shape.

The pins or rivets 70 may assist with holding the laminations before the laminations stack is placed in the injection machine.

In particular, the bars may be relatively free in the slots in the absence of pins or rivets, making them easier to fit and allowing wider dimensional tolerances in the manufacture of the bars, which may thus not need to be machined and remain in the as-extruded state.

Rotor Manufacture

In order to manufacture the rotor, the laminations 113 may be cut using a press fitted with a punch, or using a laser and openings 3 corresponding to the slots 4 and, where appropriate, to the secondary slots 40 and the bosses 5, can be formed at the time of cutting.

Next, the laminations 113 are superposed to form the stack 2 and then the bars 10 are inserted into the slots 4 by force. During insertion, the presence of the bosses 5 makes it easier for the bars 10 to advance through the stack 2 of laminations 13.

Figure 2:
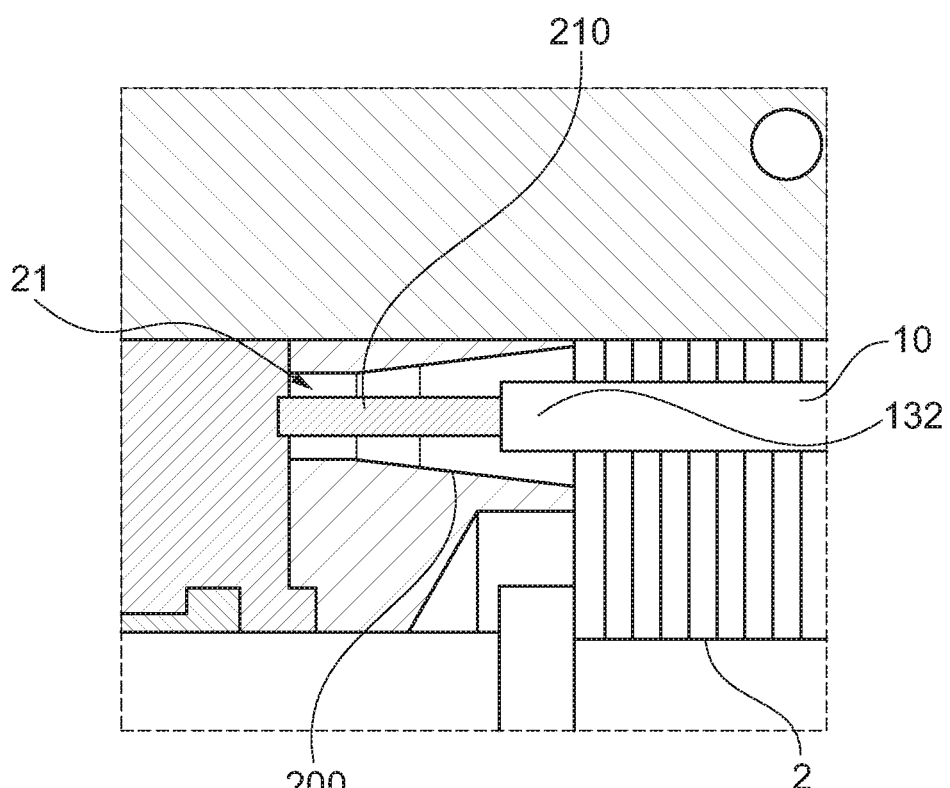
FIG. 2 depicts an embodiment detail of the injection tool.

The injection machine comprises, as illustrated in FIG. 2, a rear cavity 200 used for casting the rear short-circuiting ring 130.

The bars 10 extend beyond the laminations stack 2 and project into this rear cavity 200.

Positioning fingers 210 extend within the cavity 200 and come to bear at their axial end against the end faces of the respective bars 10.

Figure 7:
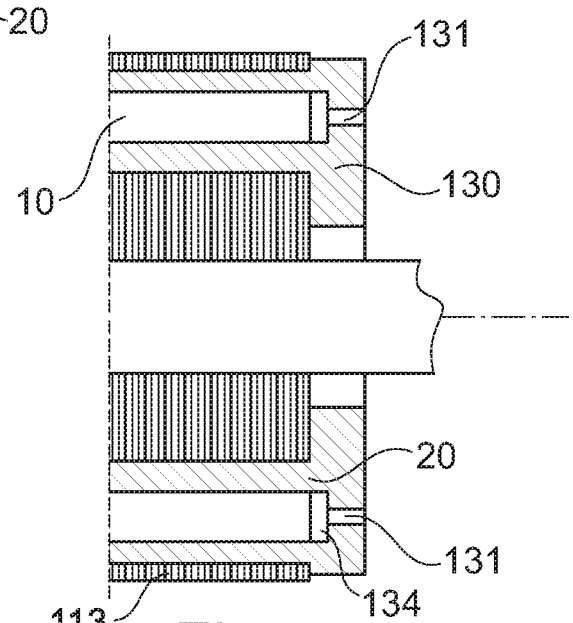

In an alternative form, the number of fingers 210 is reduced and the portion 132 of the bars that projects beyond the laminations stack is replaced by a ring of a conducting material 134, for example of copper, as illustrated in FIG. 7. The number of fingers 210 may, for example, be lower than the number of bars.

In another alternative form, the fingers 210 come to bear directly on the bars 10 at their end, and the bars lie flush with the surface of the stack 2.

Injection is performed from the front.

During injection, the aluminum flows along the slots and fills the cavities intended to form the front and rear rings 120, 130.

Figure 8:
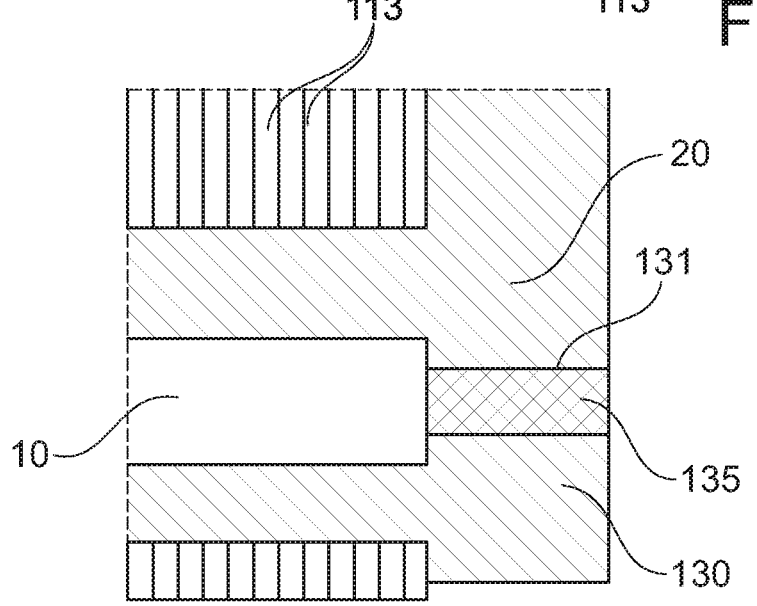
FIG. 8 depicts an embodiment detail of an alternative form of a rotor.

During demolding, the positioning fingers 210 form the recesses 131 on the rear ring 130. These recesses 131 can be plugged with a resin 135, for example, as illustrated in FIG. 8.

Of course, the invention is not limited to the exemplary embodiments which have just been described.

For example, the slots may have other shapes, as may the bars.

Materials other than copper and aluminum can be used.

The invention claimed is:

1. A method for manufacturing a rotor of a rotary electric machine, the rotary electric machine comprising a stack of magnetic laminations defining slots in which bars made from a first electrically conducting material are received, the method comprising:
    injecting a second electrically conducting material, different from the first electrically conducting material, using an injection machine, from a front of the laminations stack, and
    holding the bars at their rear end against pressure associated with injection by a positioning tool for retaining axially the bars during the injection, the positioning tool passing through a cavity used for forming a short-circuiting ring at a rear of the laminations stack.

2. The method as claimed in claim 1, the bars protruding beyond the laminations stack to come into contact with the positioning tool.

3. The method as claimed in claim 1, the bars lying flush with the surface of the stack.

4. The method as claimed in claim 1, further comprising withdrawing the positioning tool on demolding of the rotor.

5. The method as claimed in claim 3, the positioning tool comprising fingers each having a slightly conical shape converging toward the laminations stack.

6. The method as claimed in claim 1, the first material being copper.

7. The method as claimed in claim 1, the second material being aluminum.

8. The method as claimed in claim 1, the bars being in the as-extruded state.

9. The method as claimed in claim 1, the bars being mounted with clearance in the slots such that, in the absence of the positioning tool, the injection pressure would cause the bars to move axially within the stack.

10. A rotor of a rotary electric machine, obtained by implementing the method as defined in claim 1.

11. The method as claimed in claim 1, wherein the injection is performed by an injection press, the injection press comprising the cavity used for forming the short-circuiting ring at the rear of the laminations stack.

12. A method for manufacturing a rotor of a rotary electric machine, the rotary electric machine comprising a stack of magnetic laminations defining slots in which bars made from a first electrically conducting material are received, the method comprising:
    injecting a second electrically conducting material, different from the first electrically conducting material, using an injection machine, from a front of the laminations stack, and
    holding the bars at their rear end against pressure associated with injection by a positioning tool that passes through a cavity used for forming a short-circuiting ring at a rear of the laminations stack, the bars lying flush with the surface of the stack, the positioning tool comprising fingers each having a slightly conical shape converging toward the laminations stack, the rotor comprising a ring made from a conducting material, to come into contact with the positioning tool, the number of fingers being lower than the number of bars.

13. The method as claimed in claim 12, the ring being made from the first conducting material.

* * * * *